(12) United States Patent
Stephens et al.

(10) Patent No.: US 10,024,572 B1
(45) Date of Patent: Jul. 17, 2018

(54) HEAT EXCHANGER

(71) Applicant: HTP, INC., East Freetown, MA (US)

(72) Inventors: Phillip Stephens, Assonet, MA (US); Justin Jenne, New Bedford, MA (US)

(73) Assignee: HTP, INC., East Freetown, MA (US)

( * ) Notice: Subject to any disclaimer, the term of this patent is extended or adjusted under 35 U.S.C. 154(b) by 603 days.

(21) Appl. No.: 14/137,988

(22) Filed: Dec. 20, 2013

Related U.S. Application Data

(63) Continuation-in-part of application No. 29/450,083, filed on Mar. 15, 2013.
(60) Provisional application No. 61/740,034, filed on Dec. 20, 2012.

(51) Int. Cl.
*F28D 7/04* (2006.01)
*F22B 21/26* (2006.01)
*F24H 1/20* (2006.01)

(52) U.S. Cl.
CPC .................................. F24H 1/205 (2013.01)

(58) Field of Classification Search
USPC ..... 122/247, 249, 118, 114, 169, 15.1, 18.1; 165/163, 181, 184
See application file for complete search history.

(56) References Cited

U.S. PATENT DOCUMENTS

| | | | |
|---|---|---|---|
| 1,885,040 A * | 10/1932 | Arnold ..................... | F24H 1/205 122/118 |
| 2,003,742 A * | 6/1935 | Elliott ....................... | F24H 1/36 122/118 |
| 3,053,511 A | 9/1962 | Godfrey | |
| 3,308,879 A | 3/1967 | Maddocks | |
| 3,612,175 A | 10/1971 | Ford et al. | |
| 3,890,936 A | 6/1975 | McInerney et al. | |
| 3,942,355 A | 3/1976 | McInerney et al. | |
| 4,241,723 A * | 12/1980 | Kitchen .................. | F23C 15/00 122/18.31 |
| 4,766,883 A * | 8/1988 | Cameron ................ | F23N 1/027 122/121 |
| 5,228,413 A * | 7/1993 | Tam ......................... | F24H 1/48 122/15.1 |
| 5,365,888 A | 11/1994 | Aronov | |
| 5,437,248 A * | 8/1995 | Miura ...................... | F22B 9/12 122/18.31 |
| 6,044,837 A * | 4/2000 | Tyler ....................... | F24H 3/065 122/250 R |
| 6,790,481 B2 | 9/2004 | Bishop et al. | |
| 7,415,943 B2 * | 8/2008 | Missoum ................ | F24H 1/287 122/18.1 |
| 8,720,387 B2 * | 5/2014 | Pacholski ............... | F24H 1/287 122/15.1 |
| 8,763,564 B2 * | 7/2014 | Abdel-Rehim ......... | F24H 1/206 122/18.1 |
| 8,813,688 B2 * | 8/2014 | Pacholski ............... | F24H 1/287 122/15.1 |
| 2003/0066632 A1 | 4/2003 | Bishop et al. | |
| 2003/0106676 A1 | 6/2003 | Bishop et al. | |
| 2005/0077341 A1 | 4/2005 | Larrieu et al. | |

(Continued)

*Primary Examiner* — Gregory A Wilson
(74) *Attorney, Agent, or Firm* — Adler Pollock & Sheehan P.C.; Daniel J. Holmander, Esq.

(57) ABSTRACT

The invention generally relates to a heat exchanger. More particularly, the present invention relates to a heat exchanger configured for optimizing a percentage of heat exchange surface within an identified range of heat flux, or rate of heat energy transfer through a given surface, on a boiling curve.

8 Claims, 16 Drawing Sheets

(56) References Cited

U.S. PATENT DOCUMENTS

| | | | |
|---|---|---|---|
| 2007/0163521 A1* | 7/2007 | Kim | F22B 21/22 122/1 B |
| 2007/0209606 A1* | 9/2007 | Hamada | F24H 1/43 122/18.1 |
| 2008/0296006 A1 | 12/2008 | Manasek | |
| 2010/0012308 A1 | 1/2010 | Scheidegger et al. | |
| 2010/0170452 A1 | 7/2010 | Ford et al. | |

* cited by examiner

HEAT EXCHANGER

CROSS REFERENCE TO RELATED APPLICATIONS

This continuation-in-part patent application is related to and claims priority from earlier filed, U.S. Non-Provisional patent application Ser. No. 29/450,083 filed Mar. 15, 2013, and U.S. Provisional Patent Application No. 61/740,034 filed Dec. 20, 2012, all of which are incorporated herein by reference.

BACKGROUND OF THE INVENTION

In general, this invention relates to water heaters and other heat transfer systems. More specifically, the invention relates to a heat exchanger and methods for transfer of heat to fluids. More particularly, the present invention relates to a heat exchanger configured for optimizing a percentage of heat exchange surface within an identified range of heat flux, or rate of heat energy transfer through a given surface, on a boiling curve.

Heat transfer fluids are heated to desired working temperatures for transfer of process heat in a wide range of water heater systems and other types such as boilers, central heaters, closed loop systems, residential and commercial water heaters, and water processing systems as an example.

Prior art heating apparatus including a central heat flame and a surrounding heater tube array is disclosed in U.S. Pat. Nos. 4,793,800, 4,723,513, 4,473,034, 4,444,155 and 4,338,888. U.S. Pat. No. 4,679,528 discloses a heating boiler having a central heating flame and a surrounding coil heater tube. The products of combustion pass radially through the heater tube coil, and are discharged through an axially extending vent.

Heat transfer fluids are typically heated as they flow through heater or heating tubes of a heat exchanger. In such cases, the liquid flow within the heater tube is characterized by a temperature profile that includes a relatively higher film temperature at radially outward regions in the heater tube and a relatively lower bulk fluid temperature at radially inward regions adjacent the central core region of the tube. This variance in temperature provides difficulties in maintaining a design operating temperature substantially at or near the upper thermal limit of the heat transfer fluid.

Therefore, there is a desire to improve the configuration of the heat exchangers to provide an optimal percentage of heat exchange surface within an identified range of heat flux, thus maximizing the efficiency of heat flux. In addition, there is a desire that the heat exchanger be compact since it will often comprise an ancillary device or a component of a more comprehensive apparatus.

BRIEF SUMMARY OF THE INVENTION

In general, this invention relates to water heaters and other heat transfer systems. More specifically, the invention relates to a heat exchanger and methods for transfer of heat to fluids. More particularly, the present invention relates to a heat exchanger configured for optimizing a percentage of heat exchange surface within an identified range of heat flux, or rate of heat energy transfer through a given surface, on a boiling curve.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
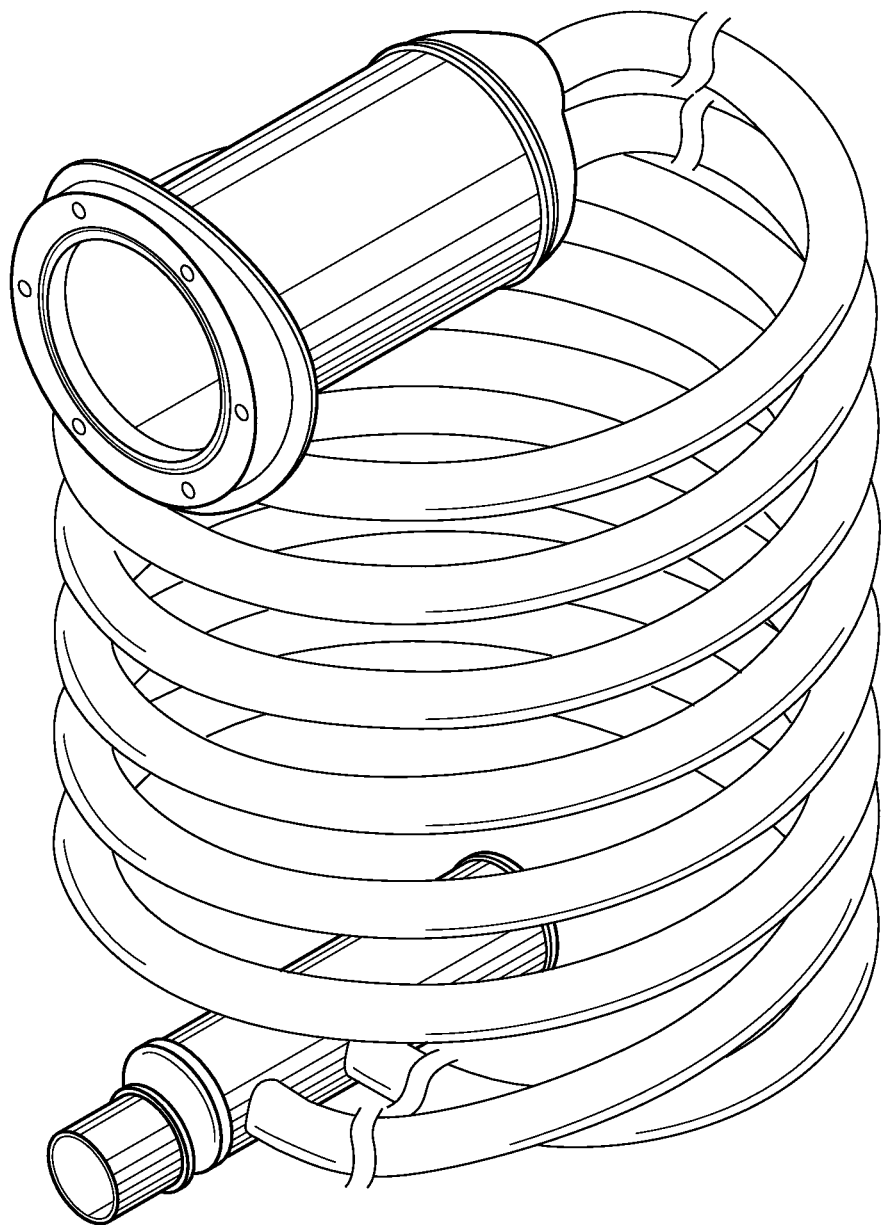
FIG. 1 is a perspective view of a heat exchanger of the present invention.
Figure 2:
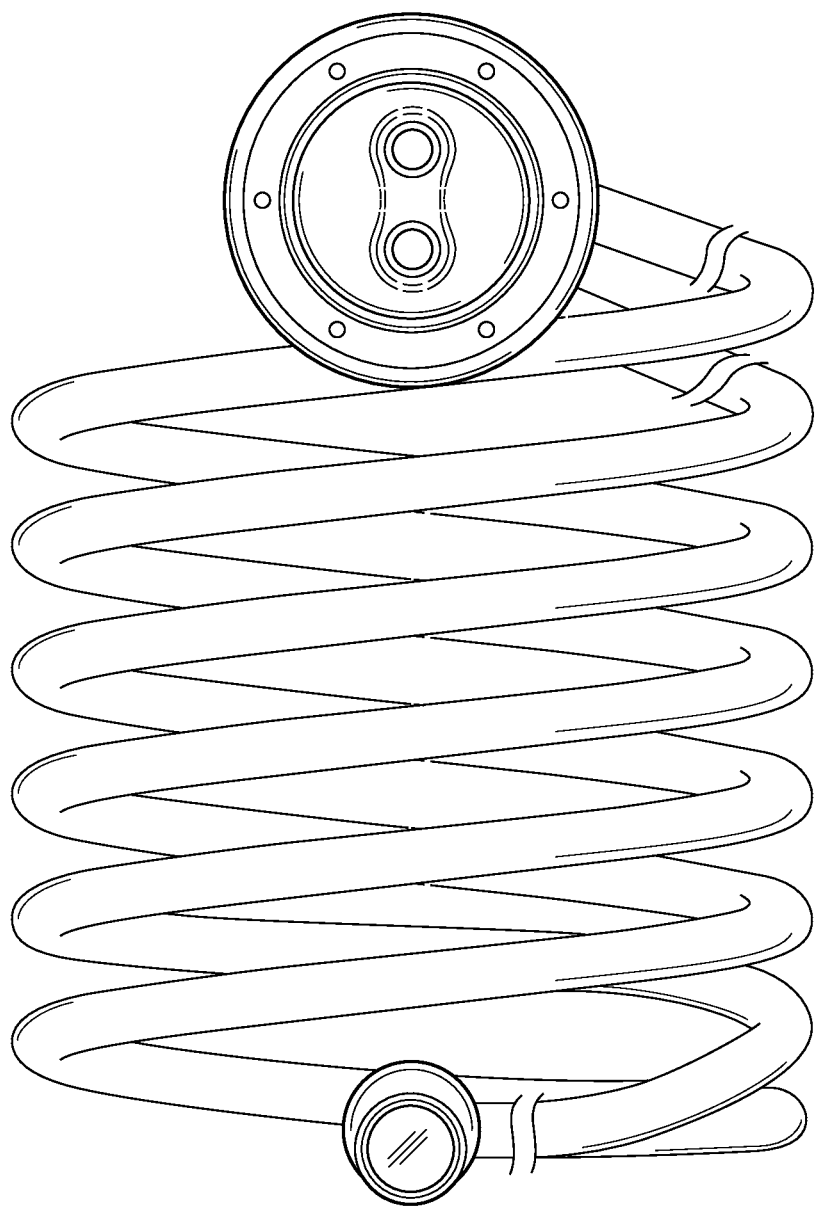
FIG. 2 is a front view thereof.
Figure 3:
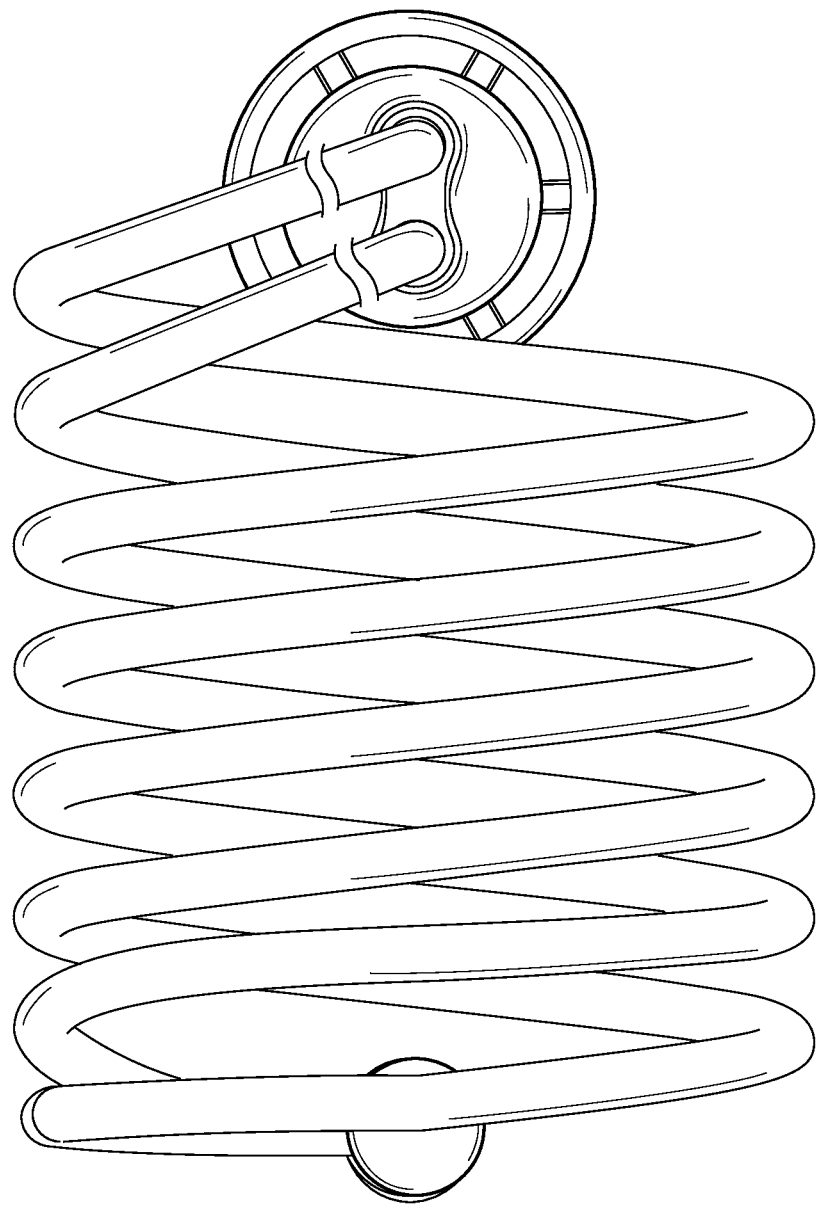
FIG. 3 is a rear view thereof.
Figure 4:
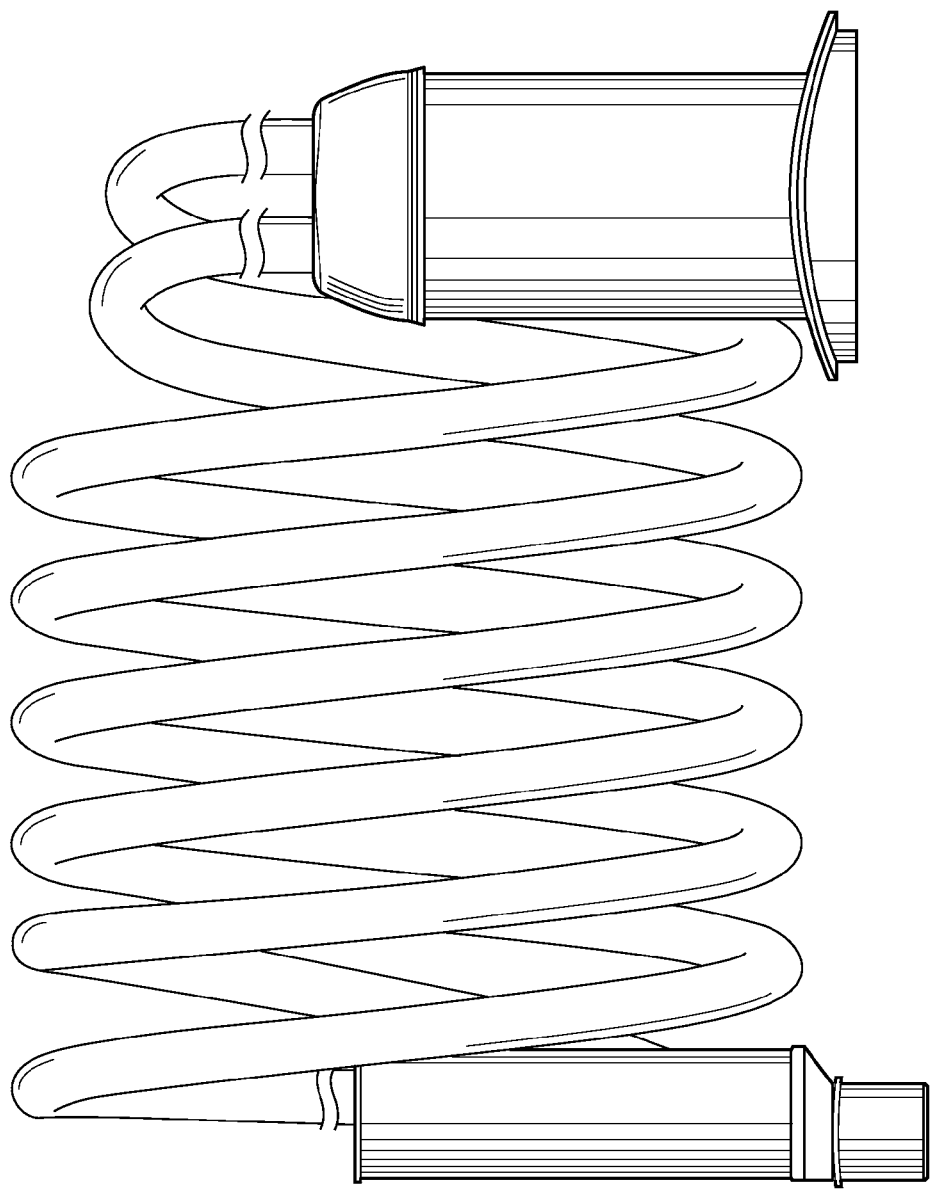
FIG. 4 is a left side view thereof.
Figure 5:
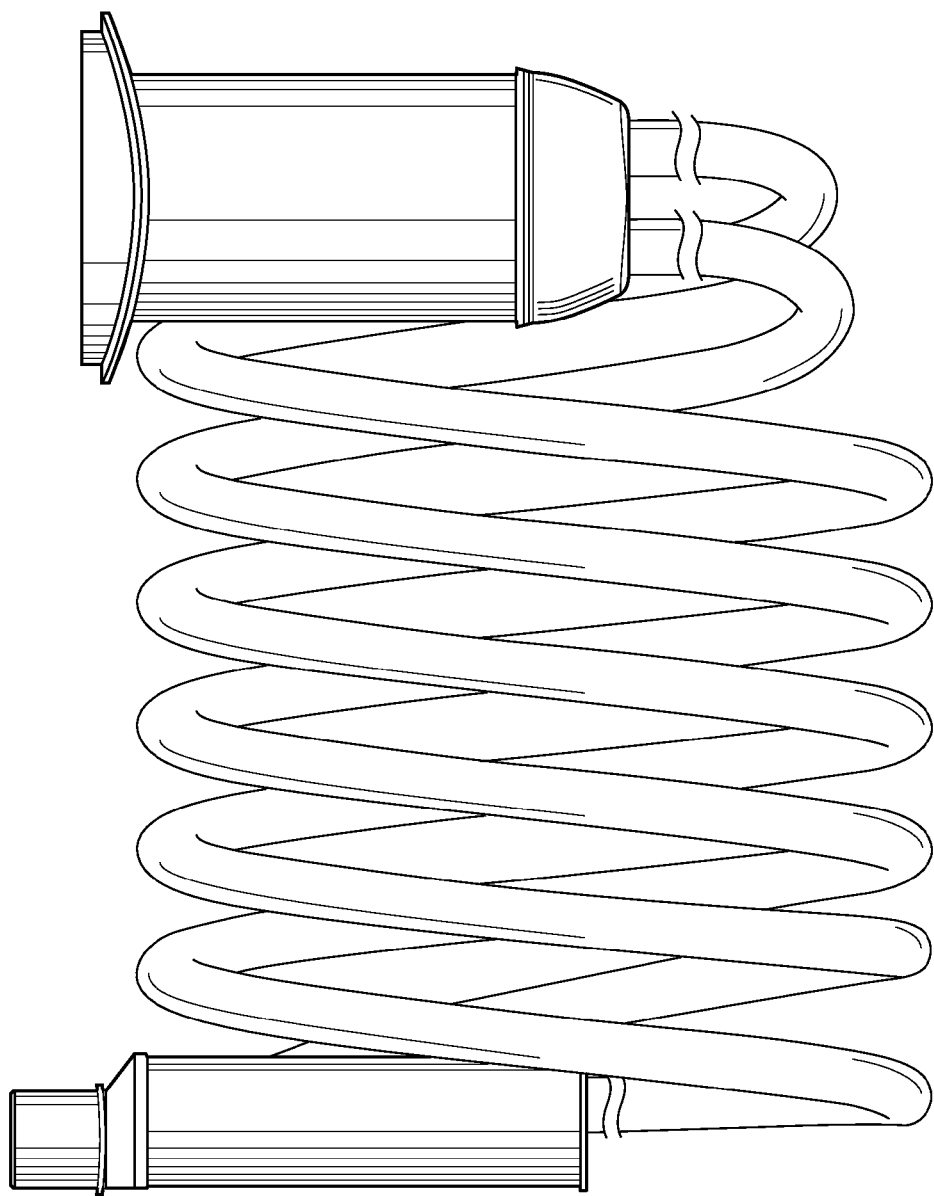
FIG. 5 is a right side view thereof.
Figure 6:
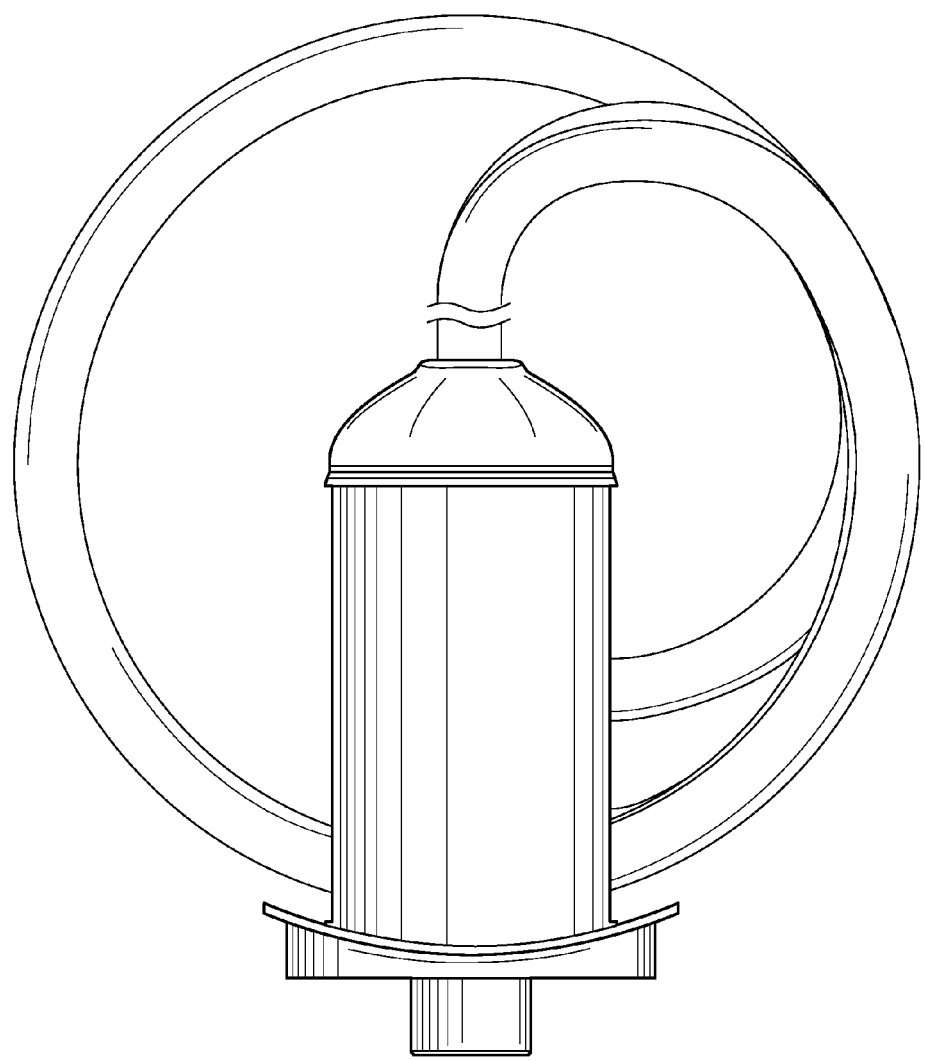
FIG. 6 is top view thereof.
Figure 7:
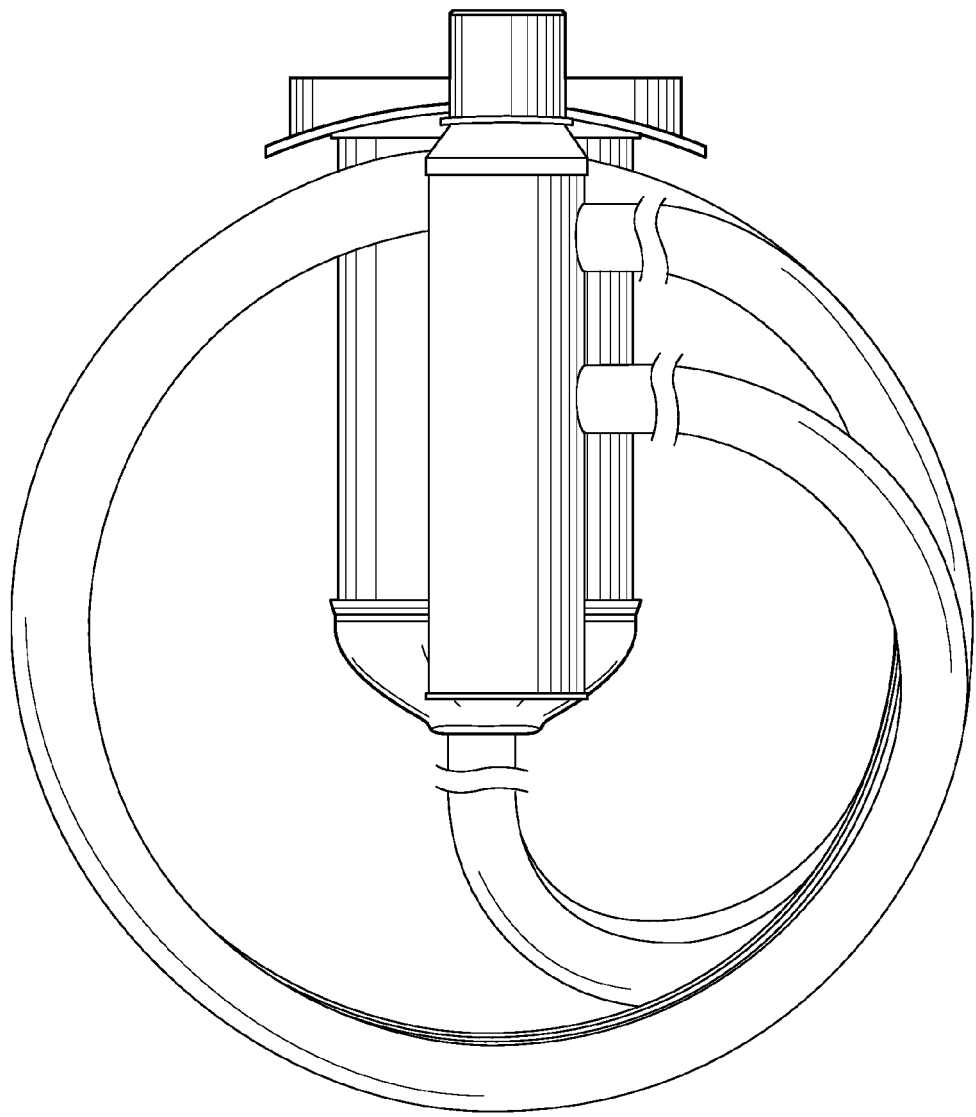
FIG. 7 is a bottom view thereof.

Referring generally to FIGS. 1-16, the present invention provides relates to water heaters and other heat transfer systems. More specifically, the invention relates to a heat exchanger and methods for transfer of heat using fluids. More particularly, the present invention relates to a heat exchanger configured for optimizing a percentage of heat exchange surface within an identified range of heat flux, or rate of heat energy transfer through a given surface, on a boiling curve.

A first embodiment of the heat exchanger of the instant invention is generally illustrated in FIGS. 1-11. The heat exchanger may be part of a variety of heat transfer systems in a variety of configurations. For example, the heat exchanger may be included within a water heating systems and other heat transfer apparatus or systems such as boilers, central heaters, closed loop systems, residential and commercial water heaters, and water processing systems as an example. In one embodiment, the present invention relates to a heat exchanger configured for use in water heaters or other heating systems, such as those disclosed in U.S. Publ. Patent Appl. No. 2009/0139513 (Davis) and U.S. Publ. Pat. Appl. No. 2011/0259322 (Davis et al.), which are both owned by applicant and incorporated herein by reference. More specifically, the heat exchanger is incorporated in a circulatory fluid pathway that contains a heat-transferring fluid or medium within the heat transfer system.

Referring generally to FIGS. 1-11, the heat exchanger comprises a combustion chamber located at an upper portion, an exhaust chamber located at a lower portion, and one or more pipe or fluid elements connected, preferably fluidly connected, at upper end to the combustion chamber and a lower end to the exhaust chamber. In one embodiment, the combustion chamber defines a larger cylindrical shape with one or more apertures for connecting to one or more pipe or fluid elements. In another embodiment, the exhaust chamber defines a smaller cylindrical shape relative to the combustion chamber and with one or apertures for connection to one or more pipe or fluid elements. The exhaust chamber may also include an extension member to facilitate connecting within the heating transfer system. The combustion chamber or intake area may include an attachment end configured for fluidly connecting to a heating transfer system. In one embodiment, the attachment end of the combustion chamber is configuring for mounting with fasteners or other attachments means. In addition, the exhaust chamber may include an attachment end for fluidly connecting within a heating transfer system. In one embodiment, the heat exchanger is located within a storage tank of fluid to provide heat transfer to the fluid.

In each of various embodiments of the heat exchanger, the heat exchanger is in the form of a tubular helix shape. The shape and configuration of the heat exchanger provides high thermal transfer capabilities. The tubing from which the helix is formed is fabricated from a heat conductive material such as copper-nickel, by way of example. In one embodiment, the heat exchanger may include a range of five to eight tiers or turns, preferably seven, within the coiled helix shape.

A critical functionality of the present invention is related to the configuration of the heat exchanger which directly impacts the flow of heat-transferring fluid. The configuration of the heat exchanger or heat exchanger element keeps an optimal percentage of the heat exchanger surface within an identified range of heat flux, the rate of heat flow across a unit of area, on a boiling curve. This combination optimizes the efficiency and reliability of the heat exchanger.

Figure 8:
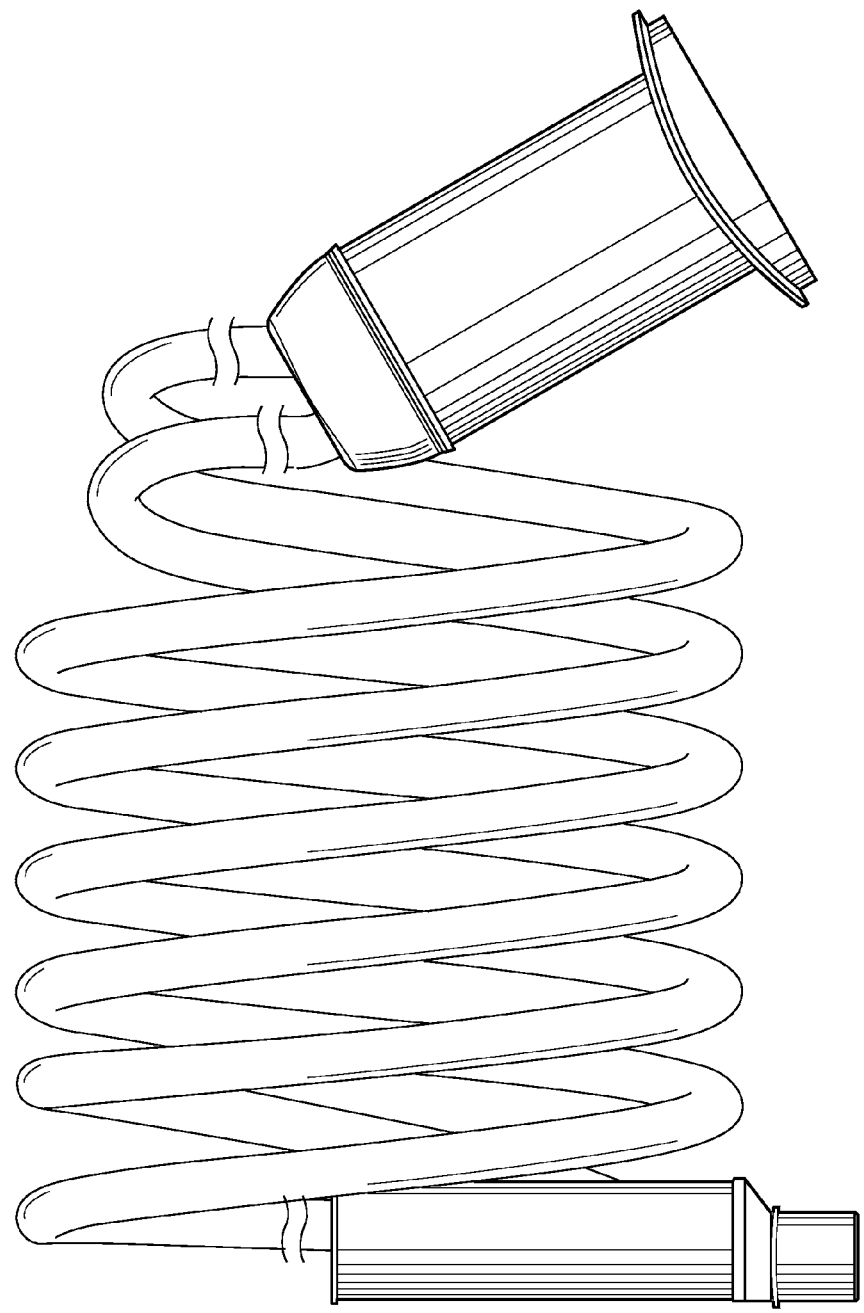
FIG. 8 is a left side view of another embodiment of the heat exchanger.
Figure 9:
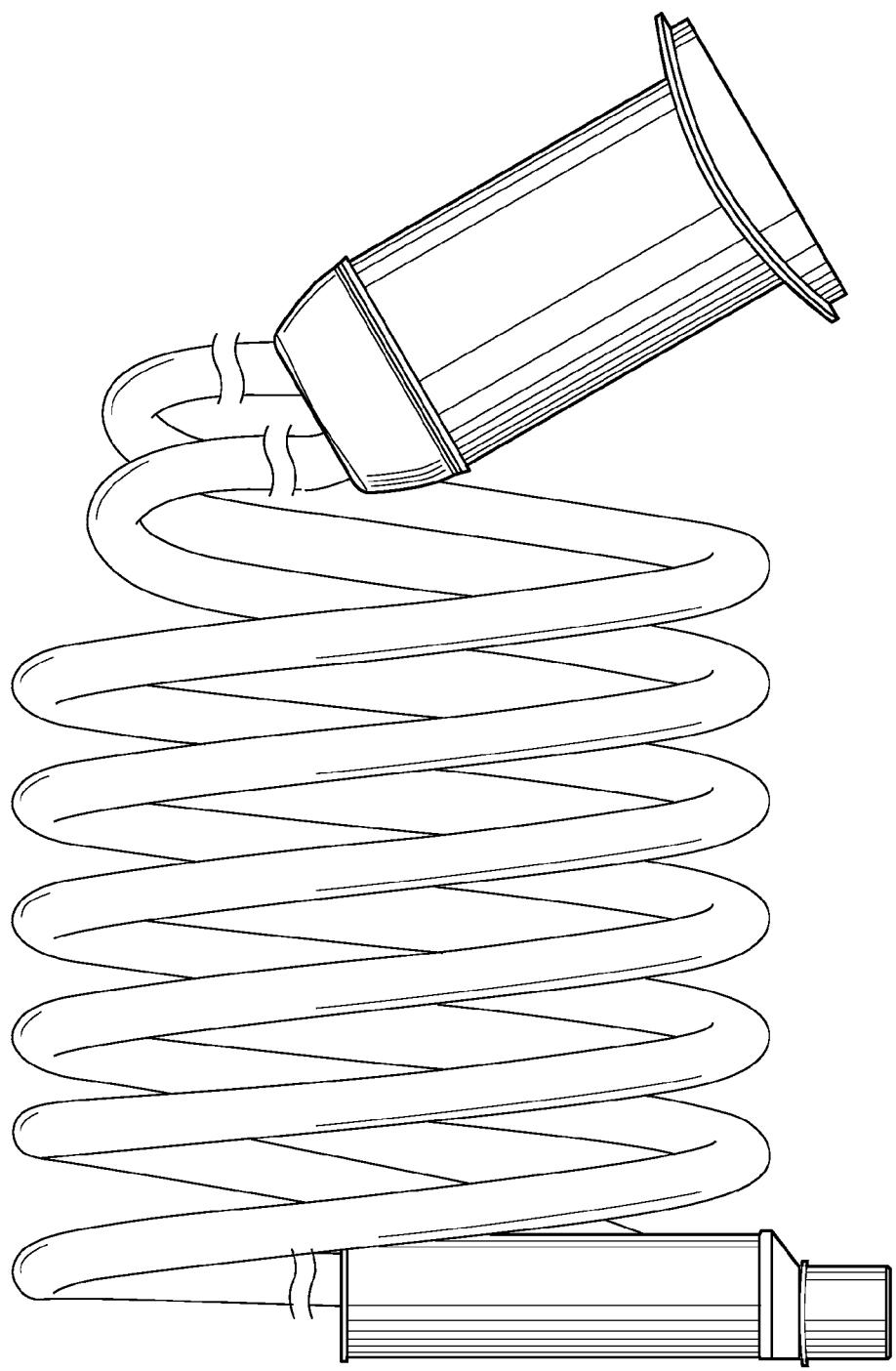
FIG. 9 is a left side view of another embodiment of the heat exchanger.

In operation, the heat-transferring fluid or medium flows through the heat exchanger starting at the upper portion through the combustion chamber and down through the heat exchanger and out of the lower portion and exhaust chamber without collecting fluid anywhere inside the geometry which is critical to its functionality and optimization of performance. Referring to FIGS. 8-9, to further prevent the collecting of fluid inside the geometry of the heat exchanger, the combustion chamber and nearby connection portions of the pipe elements may be angled or titled upwards.

Figure 10:
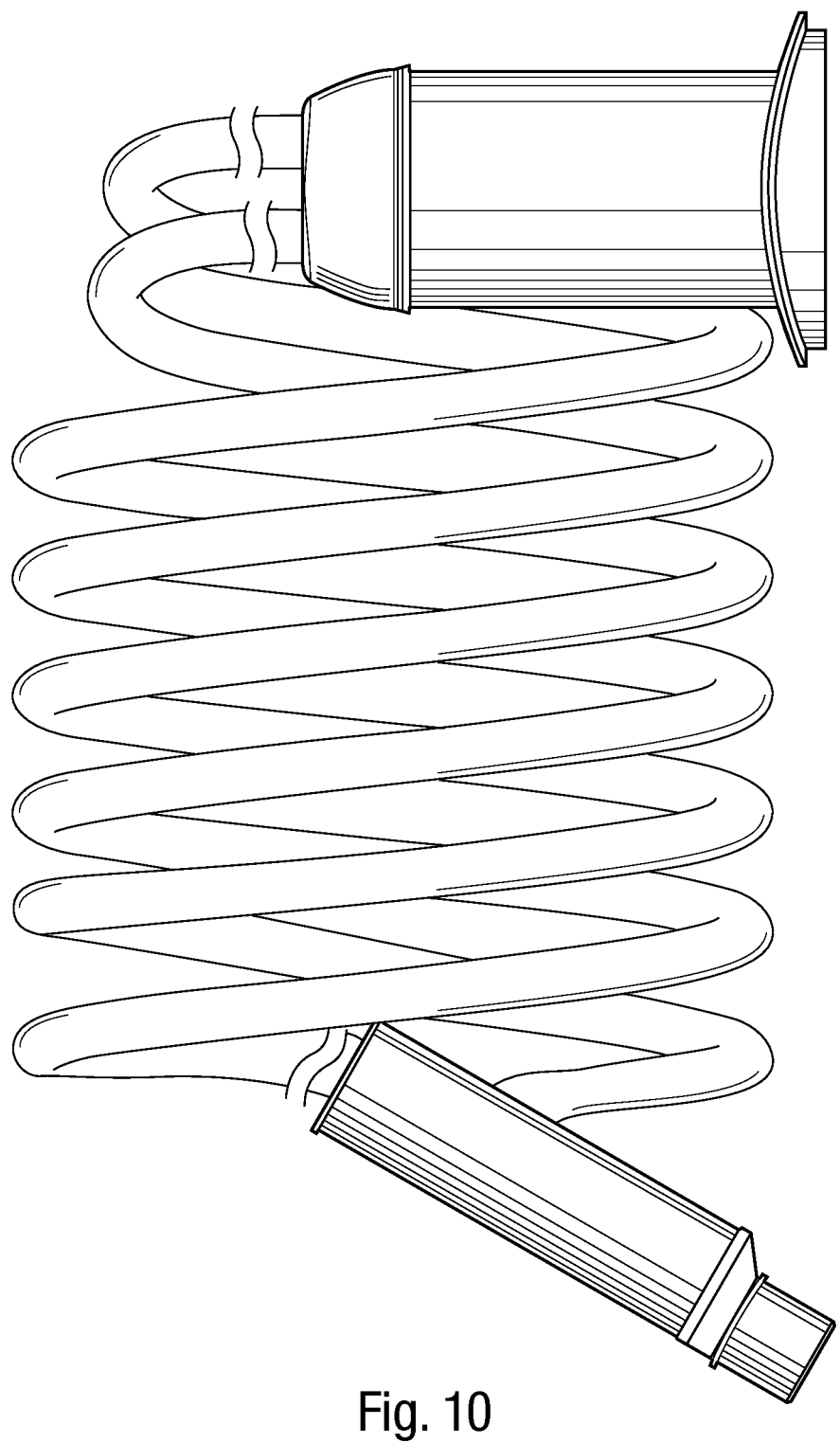
FIG. 10 is a left side view of another embodiment of the heat exchanger.
Figure 11:
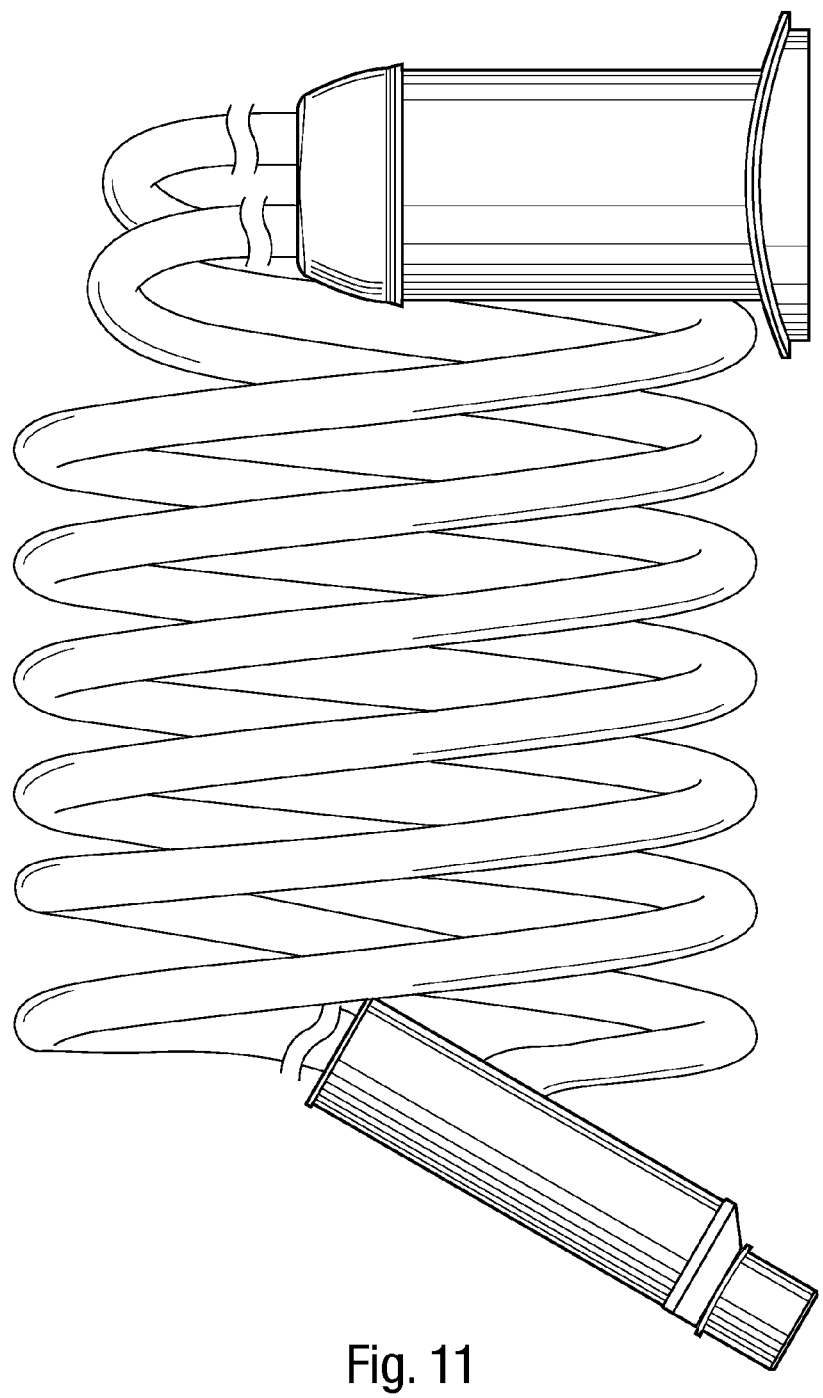
FIG. 11 is a left side view of another embodiment of the heat exchanger.

Referring to FIGS. 10-11, to further prevent the collecting of fluid inside the geometry of the heat exchanger, the exhaust chamber and nearby connected portions of the pipe elements may be angled or titled downwards. In addition, the pipe elements or tubing maybe pitcher, allowing for a compact design and flow of heat transfer fluid or medium through the tubing. As the heated heat-transferring fluid or medium passes through the heat exchanger, it transfers heat to the water stored in a water storage tank or area. It should be noted that the heat-transferring medium may include air to fluid, water to water, steam to water, glycol to water, brine to water, and the like, as is known in the art, and may be used in open and closed loop system, but is not limited thereto.

Figure 12:
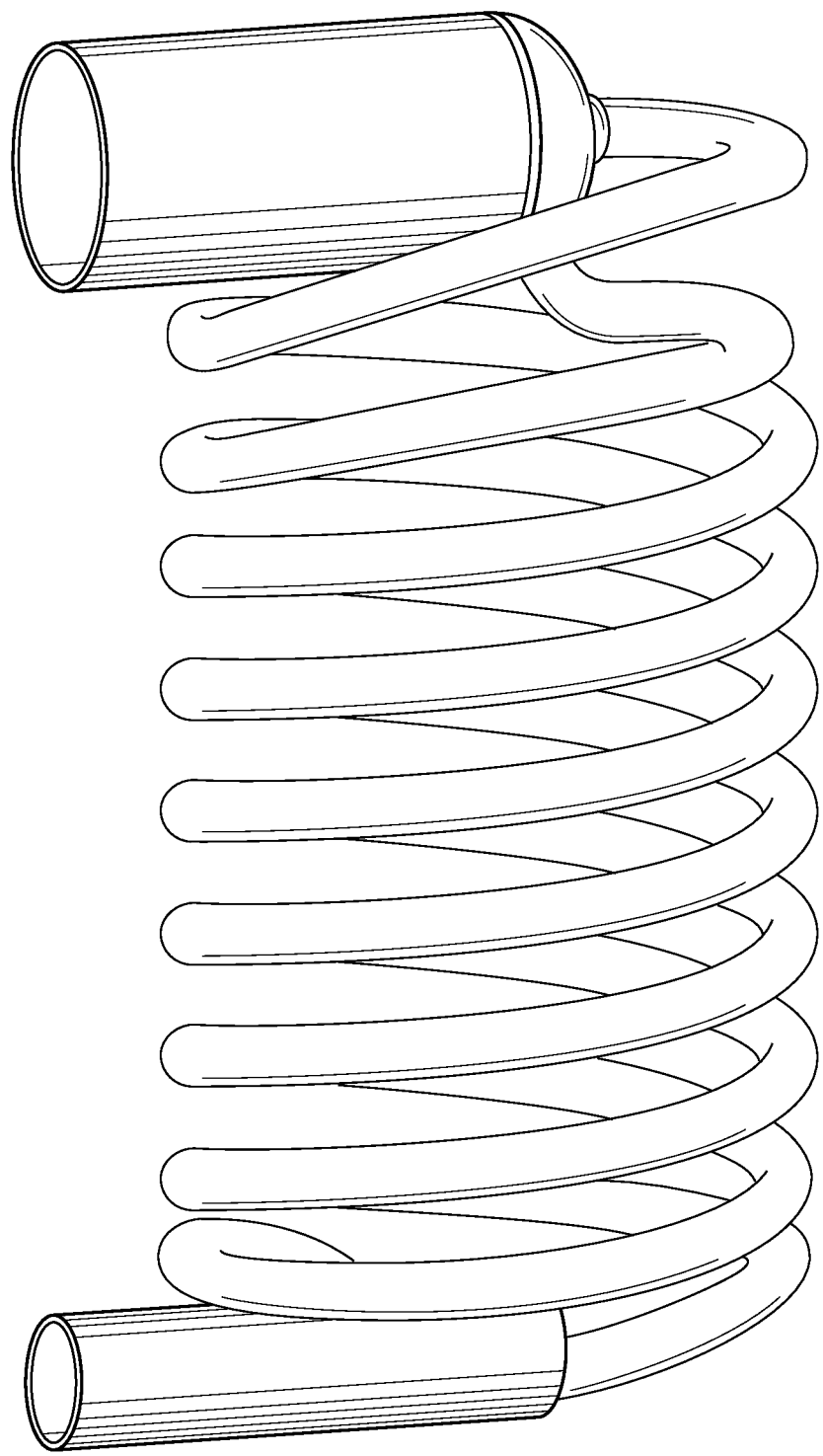
FIG. 12 is front view of another embodiment of the heat exchanger.

Referring now to FIGS. 12-16, embodiments of the heat exchanger of the instant invention are generally illustrated. Referring to FIG. 12, there is shown a heat exchanger for usage in a residential or commercial water heater or other types including boilers, central heaters, closed loop systems, residential and commercial water heaters, and water processing systems as an example. In one embodiment, the exchanger is made of a material, such as copper-nickel (also known as cupro-nickel). Cupro-nickel is an alloy of copper that contains nickel and strengthening elements, such as iron and manganese. Cupro-nickel is highly resistant to corrosion which lends itself for usage in heat exchangers. Of course, it should be noted that other types of materials may be used which are used for heat exchanger, such as copper, aluminum, or other metals but cupro-nickel is preferred. In another embodiment, the heat exchanger has a material comprising 90/10 Cupro-nickel approximately 1.1 mm thick which expands and contracts rapidly with the change in temperature eliminating scale build-up. In a further embodiment, stainless steel material approximately 1.65 mm thick may be welded or attached to a top portion of the heat exchanger made of cupro-nickel where the heat transferring medium is hottest. Of course it is contemplated that other metals or materials may be combined with cupro-nickel to be used in configuring the heat exchanger.

Figure 13:
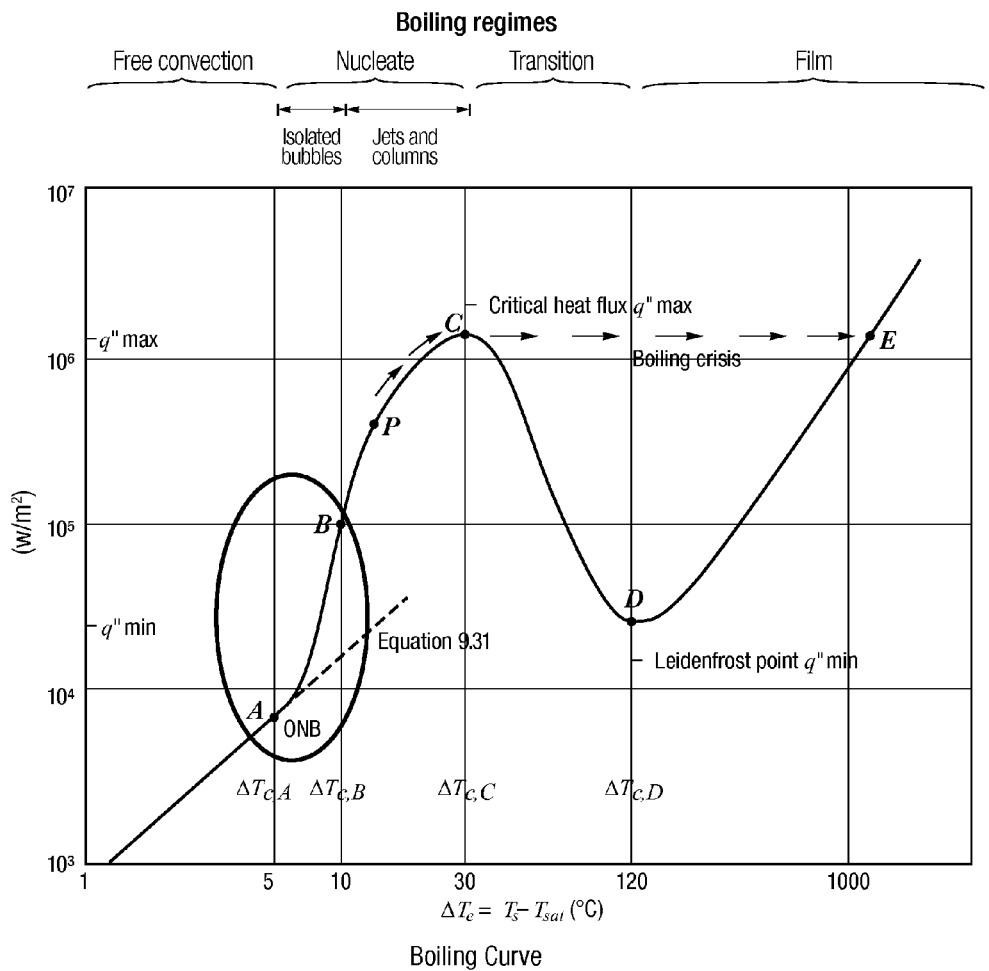
FIG. 13 is a graph of a boiling curve for the heat exchanger operating in a defined range.

The heat exchanger is configured and shaped using high efficiency copper-nickel to provide an air to fluid heat exchanger as illustrated in FIG. 12. The heat exchanger converts the heat energy from combustion gases or other heat transferring medium of a water heater or other types of heat transfer systems into fluid surrounding the heat exchanger at a high rate of efficiency, above 90% but typically between 94-98%. FIG. 13 is a representative graph of the boiling curve of one or more embodiments of the heat exchanger. The heat exchanger is configured to operate in a specific range of the boiling curve as shown in the graph. Oftentimes, a surface heat flux that is too high in the boiling curve causes failures due to boiling on the surface of the heat exchanger. While too low of the surface heat flux does not give a high efficiency heat exchanger. Referring to FIG. 13, the configuration of the heat exchanger allows the heat exchanger to keep an optimal percentage, preferably 15% (+/−5%), of the heat exchanger surface within an identified range of heat flux, preferably between $10^4$ and $10^5$ W/m2 (FIG. 13), while operating in a specific range of the boiling curve. This unique combination optimizes the efficiency and reliability of the heat exchanger.

Figure 14:
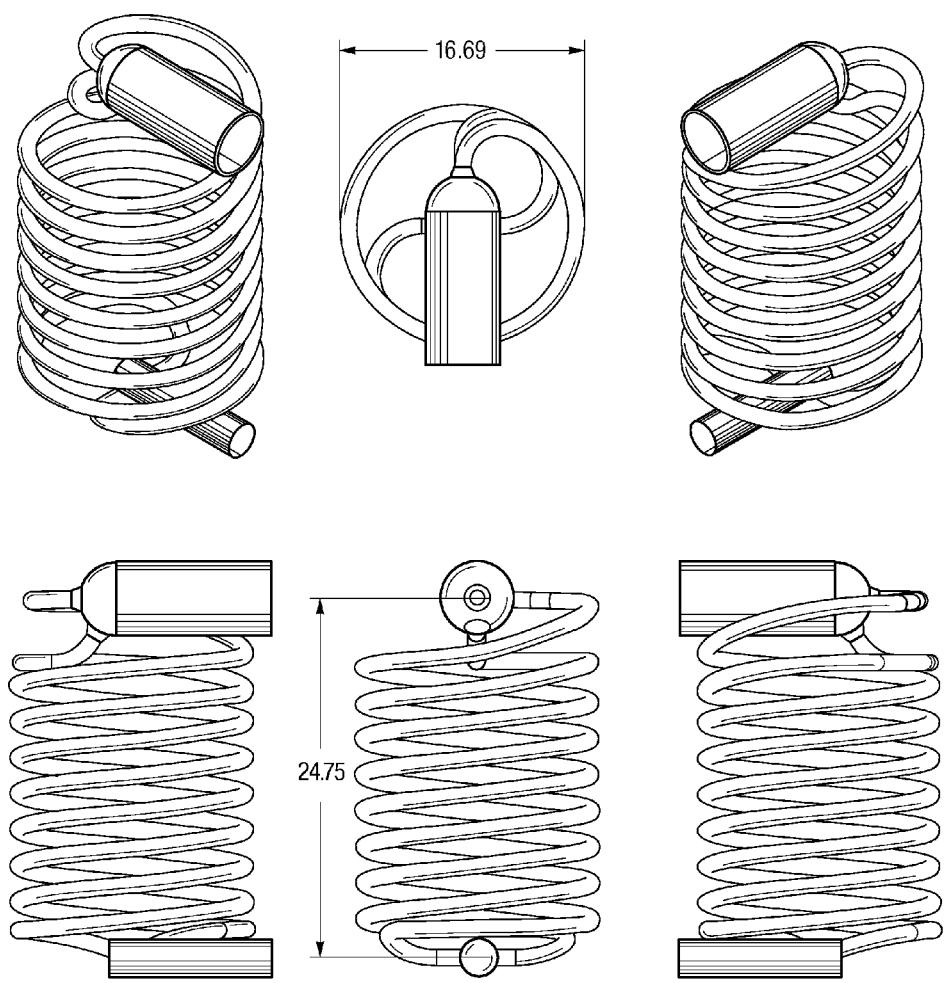
FIG. 14 is a series of views of another embodiment of the heat exchanger.
Figure 15:
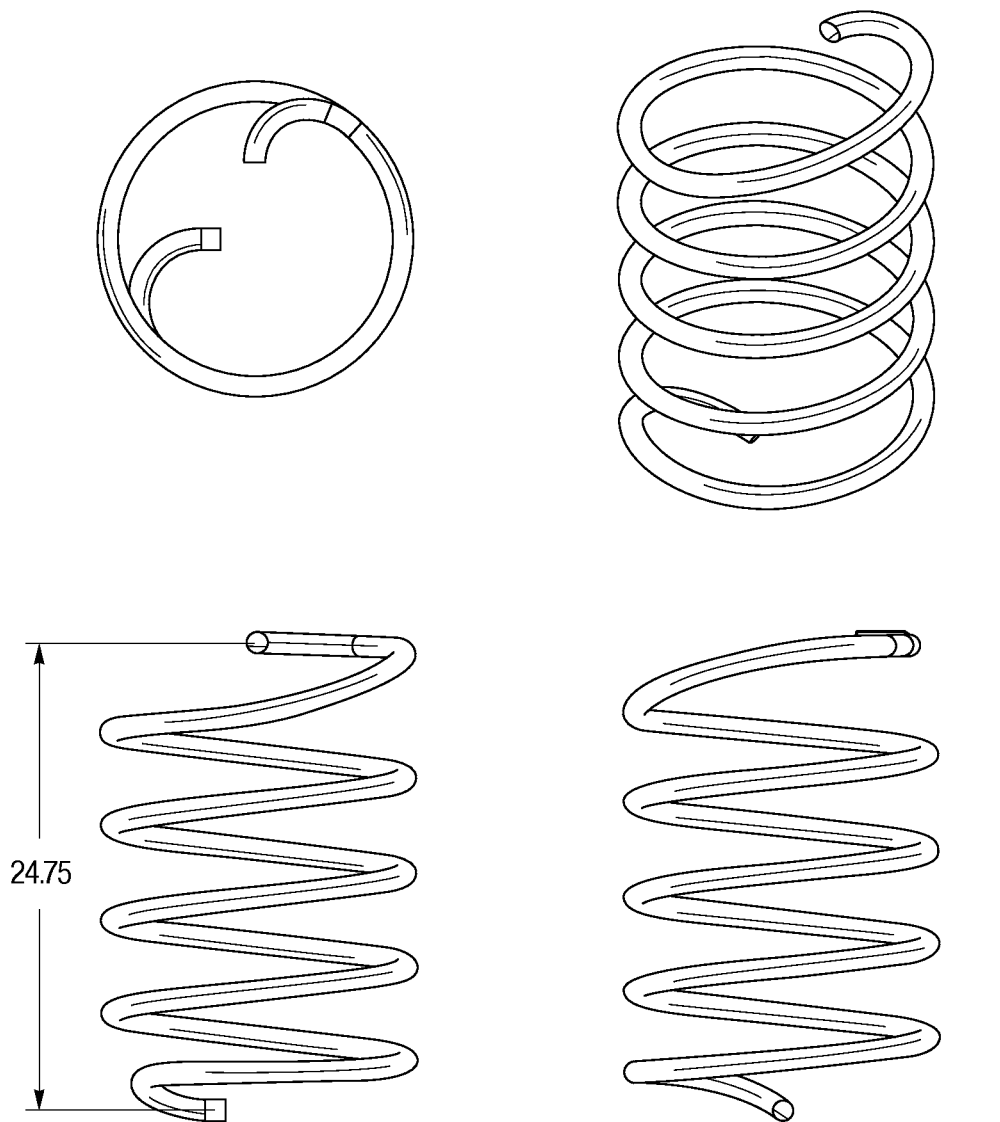
FIG. 15 is a series of views of an embodiment of a pipe element used in the heat exchanger.
Figure 16:
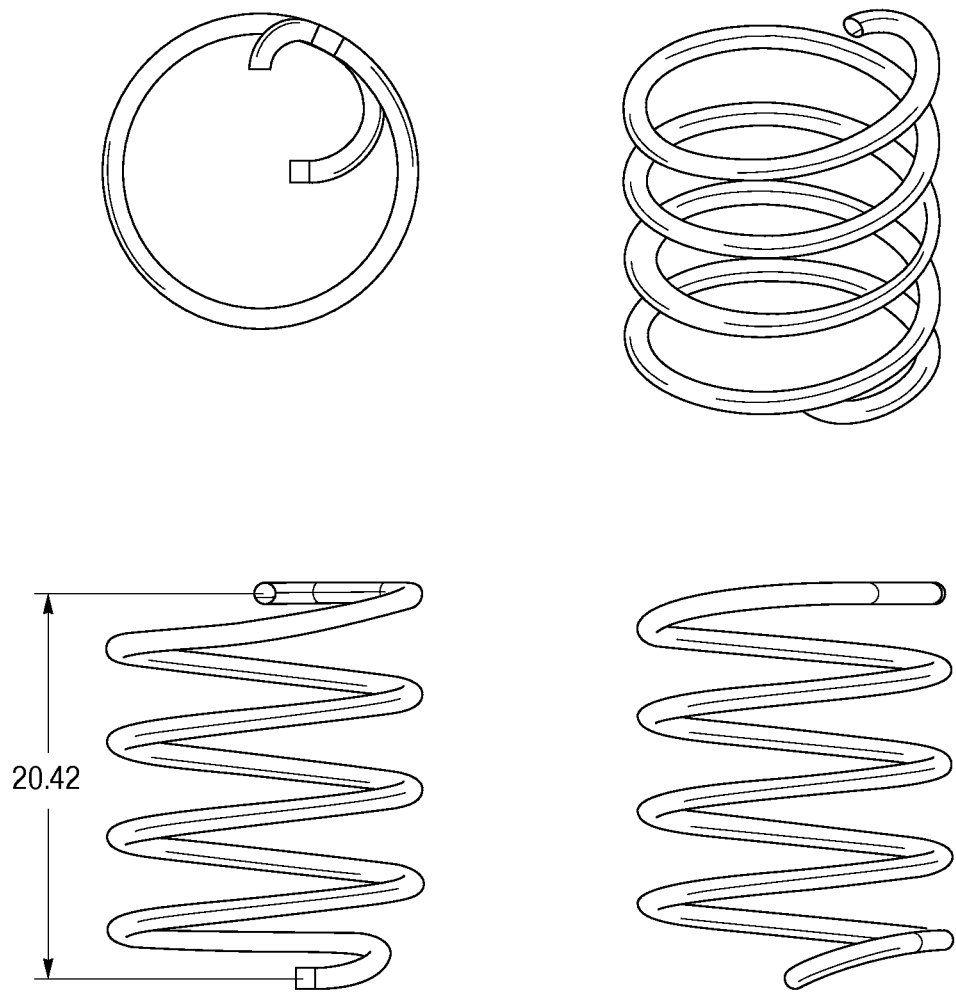
FIG. 16 is a series of views another embodiment of a pipe element used in the heat exchanger.

FIG. 14 illustrates a second embodiment of the heat exchanger that is contemplated. The general operating principles and advantages of the configuration of the heat exchanger of FIG. 12 are incorporated herein in relation to FIG. 14. FIG. 15 illustrates a first embodiment of a pipe used in the heat exchanger that is contemplated. The general operating principles and advantages of the configuration of the heat exchanger of FIG. 12 are incorporated herein in relation to FIG. 15. FIG. 16 illustrates a second embodiment of a piped used in the heat exchanger that is contemplated. The general operating principles and advantages of the configuration of the heat exchanger of FIG. 12 are incorporated herein in relation to FIG. 16.

For these reasons, the instant invention is believed to represent a significant advancement in the art, which has substantial commercial merit.

The foregoing has outlined, in general, the complete detailed description of the physical process, and or methods of application of the invention and is to serve as an aid to better understanding the intended application and use of the invention disclosed herein. In reference to such, there is to be a clear understanding the present invention is not limited to the method or detail of construction, fabrication, material, or application of use described and illustrated herein. Any other variation of fabrication, use, or application should be considered apparent as an alternative embodiment of the present invention.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature, or element, of any or all the claims.

It would be appreciated by those skilled in the art that various changes and modifications can be made to the illustrated embodiments without departing from the spirit of the present invention. All such modifications and changes are intended to be covered by the appended claims.

What is claimed is:

1. A heat exchanger of a heat transfer system for a hot water tank, comprising:
   a combustion chamber;
   an exhaust chamber angled downwardly away from the combustion chamber; and
   a fluid element connecting the combustion chamber and the exhaust chamber in fluid communication,
   wherein the fluid element is a cupro-nickel material, approximately 1.1 mm thick, and approximately 15% or more of a surface heat flux of the fluid element operates in a specific range of the boiling curve between $10^4$ and $10^5$ W/m$^2$ and the heat exchanger is a fluid to fluid heat exchanger.

2. The heat exchanger of claim 1, wherein the combustion chamber is angled upwardly away from the exhaust chamber.

3. The heat exchanger of claim 1, wherein the fluid element is a coil with 5 to 8 tiers.

4. The heat exchanger of claim 1, wherein the fluid element has 7 tiers.

5. The heat exchanger of claim 1, wherein the fluid element includes a first tubular helix.

6. The heat exchanger of claim 5, wherein the fluid element includes a second tubular helix arranged as a double helix with the first tubular helix.

7. A heat exchanger of a heat transfer system, comprising:
   a fluid storage tank;
   a combustion chamber located within the fluid storage tank;
   an exhaust chamber angled downwardly away from the combustion chamber, wherein the exhaust chamber is located within he fluid storage tank; and
   a cupro-nickel coil fluidly connecting the combustion chamber and the exhaust chamber, the cupro-nickel coil including a first tubular helix and a second tubular helix arranged as a double helix,
   wherein approximately 15% or more of a surface heat flux of the *coli* operates in a specific range of the boiling curve between $10^4$ and $10^5$ W/m$^2$, and the combustion chamber and the coil are cylindrical and the combustion chamber has a relatively larger diameter.

8. The heat exchanger of claim 7, wherein the coil is located within the fluid storage tank and the combustion chamber is angled upwardly away from the exhaust chamber so that fluid does not collect within the combustion chamber, the exhaust chamber or the cupro-nickel coil.

\* \* \* \* \*